E. M. HEYLMAN.
PLOW.
APPLICATION FILED JULY 18, 1913.
1,095,574.
Patented May 5, 1914.
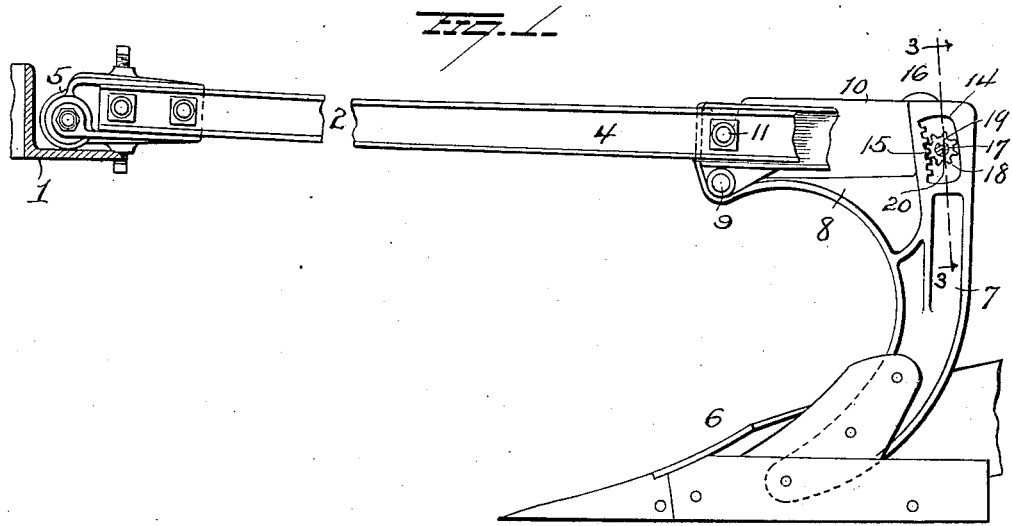
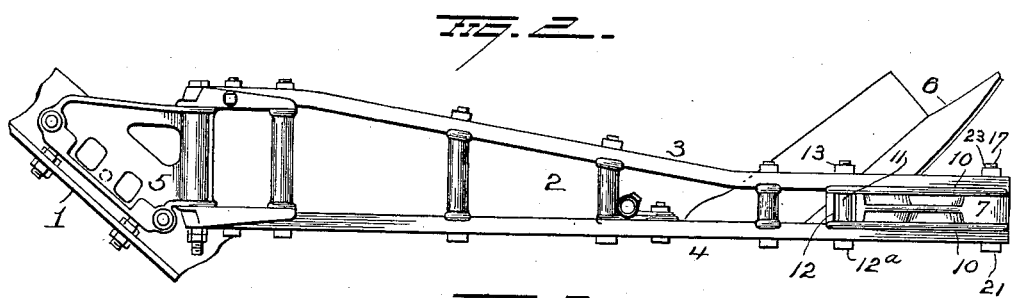
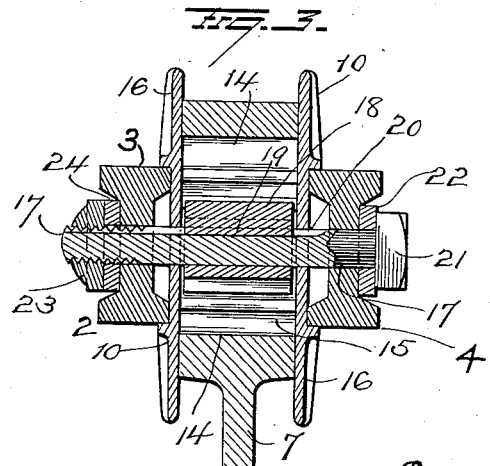
WITNESSES
E. L. Nottingham
S. L. Nottingham
INVENTOR
Edward M. Heylman
By H. A. Seymour
Attorney

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLOW.

1,095,574.        Specification of Letters Patent.        Patented May 5, 1914.

Application filed July 18, 1913. Serial No. 779,758.

*To all whom it may concern:*

Be it known that I, EDWARD M. HEYLMAN, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My invention relates to improvements in plows and particularly to such as are used in gangs, such as engine gang plow structures,—the object of the present invention being to provide simple, compact and efficient means for adjusting the suction of the plow body or soil-engaging member.

With this object in view, the invention consists in certain novel features of construction and combinations of parts as hereinafter set forth and pointed out in the claims.

In the accompanying drawings; Figure 1 is a side elevation, partly broken away, showing one unit of an engine gang plow embodying my improvements; Fig. 2 is a plan view, and Fig. 3 is an enlarged sectional view on the line 3—3 of Fig. 1.

1 represents a fragment of the truck frame of an engine gang plow structure, and 2 a plow beam comprising beam members 3—4 which may be connected with the truck frame in any suitable manner for instance by means of connecting devices such as indicated at 5.

A plow body or soil engaging member 6 is connected with the rear portion of the beam by means of a standard 7, the upper portion of which enters between the beam members 3—4 and is made with a forwardly projecting arm 8 pivotally connected at its forward end with lugs depending from the friction plate by means of a break pin 9. Friction plates 10 are disposed between the upper horizontal portion of the standard and its arm and the respective beam members 3—4 and a bolt 11 passes transversely through the beam members, friction plates and through an open slot 12 near the forward end of the standard arm. The bolt 11 is provided at one end with a head 12$^a$ and is screw-threaded at its other end with a nut 13. The rear portion of the standard is provided near its upper end with an approximately vertical and slightly curved elongated slot 14, one wall of which is provided with teeth to form a rack 15. The friction plates 10 serve to exclude dust from the slot 14 and for this purpose, the width of the rear portions of these plates is increased by the provision of flanges 16.

A bolt 17 passes transversely through the beam members 3—4 and the friction plates, and this bolt also passes through the elongated slot 14 and constitutes a shaft on which a pinion 18 is secured. To afford convenient means for securing the pinion to the bolt or shaft 17, said pinion is provided with a spline or key 19 to enter a groove or key-way 20 in the bolt or shaft. The bolt or shaft 17 is provided at one end with a head 21 between which and the adjacent beam member, a washer 22 is disposed, and the other end of said bolt or shaft is threaded for the reception of a nut 23 between which latter and the adjacent beam member, a washer 24 is placed.

In order to adjust the suction of the plow body, it is necessary to tip the point thereof upwardly or downwardly, as the case may be, and this may be accomplished by raising or lowering the plow standard in an arc of a circle of which the break pin is the center. To accomplish such an adjustment of the plow body with the use of my improvements, the nuts on the bolts 11 and 17 will first be loosened and then the operator will turn the bolt or shaft 17 (with the use of a suitable wrench) to rotate the pinion 18 and thus transmit motion through the medium of the rack 15, to the rear portion of the standard for raising or lowering the same so that it will turn on the pivotal support afforded by the break pin and thus change the pitch of the plow body. When the desired adjustment shall have been effected, the nuts on the bolts 11 and 17 will be again tightened and the standard will thus be clamped in the position to which it may be adjusted. If the break pin should become ruptured, the plow body and its standard will swing backwardly on the rack and pinion connection above described.

Various slight changes might be made in the details of construction of my invention without departing from the spirit thereof or limiting its scope and hence I do not wish to restrict myself to the precise details herein set forth.

Having fully described my invention what

I claim as new and desire to secure by Letters-Patent, is:—

1. The combination with a plow beam and a plow body, of a standard secured to the plow body and having a pivotal connection with the beam forwardly of the rear end of the latter, and a rack-and-pinion connection between the standard and beam, said rack-and-pinion connection being located rearwardly of the pivotal connection of the standard with the beam and operative to swing the standard on said pivotal connection to adjust the suction of the plow body.

2. The combination with a plow beam and a plow body, of a standard secured to the body and pivotally connected with the beam, said standard having a slot in rear of the pivotal connection of the standard with the beam, one wall of said slot having teeth forming a rack, a bolt passing through the beam and said slot, and a pinion secured to said bolt and meshing with said rack.

3. The combination with a plow beam comprising two members, and a plow body, of a standard secured to the plow body and having a forwardly projecting arm pivotally connected with the beam members and having a slot near such pivotal connection the upper portion of said standard entering between the beam members and having an elongated slot in its rear portion, one wall of said slot having teeth forming a rack, friction plates interposed between the standard and said forwardly projecting arm and the beam members, bolts passing through the beam members and friction plates and through the slots in the standard and its arm, nuts on said bolts, and a pinion secured to one of said bolts and meshing with said rack.

In testimony whereof, I have signed this specification in the presence of two subscribing witnesses.

EDWARD M. HEYLMAN.

Witnesses:
 EDWIN NICAR,
 KATE E. BUCKLEY.